Inventors
John M. Horn
Benjamin S. Ember
By John P Hirell
Attorney

United States Patent Office 3,305,121
Patented Feb. 21, 1967

3,305,121
CLAMPING DEVICE FOR HIGH
PRESSURE VESSELS
John M. Horn and Benjamin S. Ember, York, Pa., assignors to Allis-Chalmers Manufacturing Company, Milwaukee, Wis.
Filed Aug. 1, 1963, Ser. No. 299,263
3 Claims. (Cl. 220—5)

This invention pertains to high pressure vessels in general and more particularly to a quick acting and highly effective clamping device for connecting the parts of the vessel together.

Pressure vessels are continually being exposed to higher and higher pressures and it is, therefore, necessary to design clamping devices which will withstand these higher pressures. In order to effectively clamp the parts of a high pressure vessel together, it is desirable to exert a clamping force on both the inner and outer surfaces of the vessel. In many cases this results in an elaborate and complicated structure which requires considerable time to attach or disconnect.

It is a general object of this invention to provide a clamping device for a high pressure vessel wherein clamping members are provided on both the inner and outer surfaces of the vessel and means are included to quickly connect and disconnect the clamping devices.

An additional object of the subject invention is to provide a high pressure vessel of the hereinbefore described type wherein movement of the clamping members is controlled by guide means.

A further object of the subject invention is to provide a high pressure vessel of the hereinbefore described type wherein power means are included to open and close the clamping members.

Another object of the subject invention is to provide a high pressure vessel of the hereinbefore described type wherein the power and guide means are all supported on one part of the vessel so that the other part of the vessel can be easily removed.

A further object of the subject invention is to provide a high pressure vessel with a seal which permits limited relative movement between the vessel parts without destroying the sealing effect.

These and other objects of the subject invention will become more fully apparent as the following description is read in light of the attached drawings, wherein.

Figure 1:
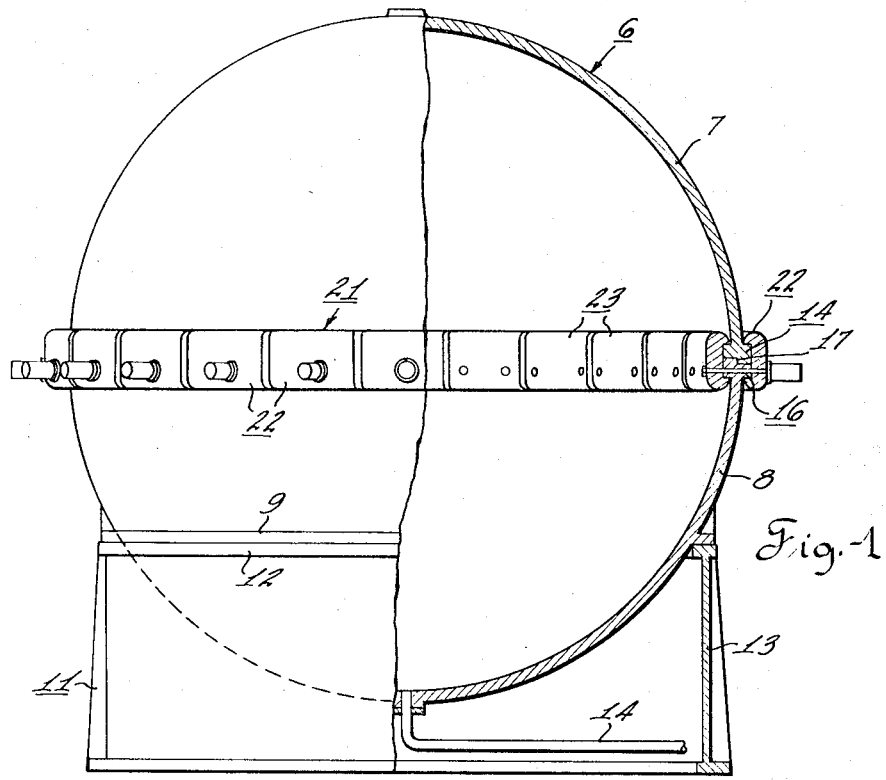
FIG. 1 is a side elevation partially broken away of a preferred embodiment of the invention.
Figure 3:
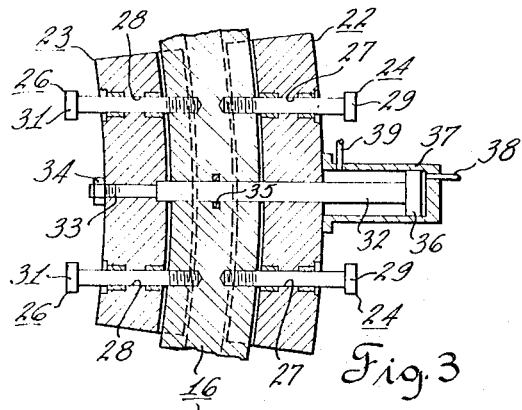
FIG. 3 is a cross section taken along the lines III—III of FIG. 2.

Referring to the attached drawing, the pressure vessel generally designated 6 may be constructed in any conventional form and is herein shown in the form of a sphere divided into an upper part 7 and a lower part 8. The sphere may be supported in any conventional manner and is herein shown as including an annular flange 9 resting on a support member 11. The support may include an annular flange 12 which receives the sphere flange 9 and which permits the lower portion of the sphere part 8 to fit within the side walls 13 of the support 11.

Any conventional means may be provided to withdraw the fluid contained within the sphere. As herein shown for purposes of illustration, a pipe 14 is connected to the lowermost part of the sphere in any conventional manner.

Figure 2:
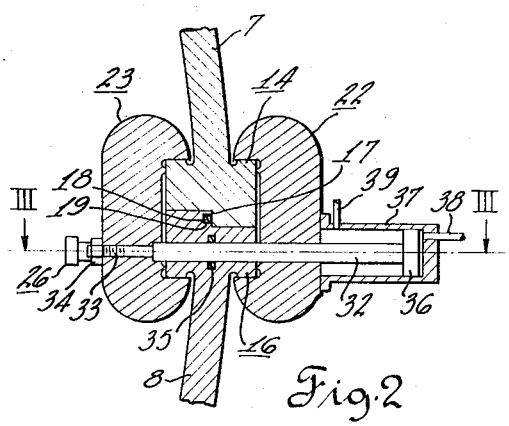
FIG. 2 is a cross section of the clamping means in operative engagement with the pressure vessel.

The upper part 7 of the sphere has an annular L-shaped flange 14 about the open end thereof. The lower part 8 of the sphere has an oppositely disposed complementary L-shaped annular flange 16. The flanges 14 and 16 when properly joined as shown in FIGS. 1 and 2 define an annular joint 17 disposed in a plane parallel to the direction of separation of the sphere parts. In the particular embodiment shown the joint 17 is disposed in a vertical plane. An annular seal member 18 is provided between the mating surfaces of the flanges 14 and 16 along the joint 17. This seal may be of any conventional design and is herein shown as an O-ring positioned in an annular groove 19 provided in the joint surface of the flange 16.

Although the clamping device of the subject invention may be constructed of different configurations, due to the spherical shape of the pressure vessel shown, the clamp shown is annular. The clamping device of this modification includes a series of arcuate segments generally designated 21. Each clamping segment 21 includes an outer member 22 and an inner member 23. Each member 22 and 23 is provided with means to guide and limit the amount of movement of the members relative to the sphere. In this particular embodiment the guide means are disclosed in the form of pins 24 and 26. These pins may be connected to the lower vessel part 8 in any conventional manner and are herein shown as provided with a threaded portion for rigid connection thereto. Each pin 24 and 26 passes through openings 27 and 28 in their respective clamping members 22 and 23. To limit movement of the clamping members 22 and 23 relative to the sphere 6, shoulders or heads 29 and 31 may be provided on the pins 24 and 26, respectively.

Means are also provided for movement of each clamp member 22 and 23 relative to one another and to the sphere 6. Such relative movement may be imparted to the clamp members in any conventional manner and is herein shown as including a first member or piston rod 32 connected to the inner clamp member 23 in any conventional manner such as by a threaded portion 33 and a nut 34. The piston rod 32 may extend completely through both the lower flange 16 and the outer clamp member 22; however, it is permitted to move freely relative thereto. The outer end of piston rod 32 is connected to a conventional piston 36 which is reciprocably contained within a cylinder or second member 37. The second member or cylinder 37 is connected to the outer member 22 in any conventional manner. The cylinder 37 is of the double acting type and has inlet and exhaust ports 38 and 39.

Figure 4:
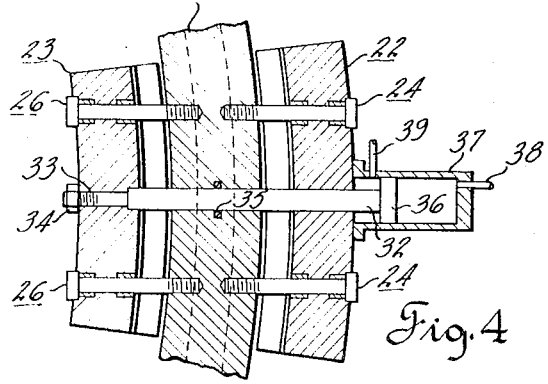
FIG. 4 is a view similar to FIG. 3 however showing the clamping device in a disengaged position.

With the high pressure sphere 6 in the position shown in FIG. 1, if it is desired to remove the upper part 7, the clamping segments 21 are expanded as shown in FIG. 4. This is accomplished by pressurizing the right side of the piston 36 by delivering pressurized fluid through the inlet 38. This causes the piston rod 32 to move to the left carrying the inner clamping segment 23 with it. When the inner clamping segment 23 has reached the limit of its travel by engaging the shoulders 31 on the guide pins 26 further pressurizing of the right side of the piston 36 causes the outer clamping segment 22 to move to the right with the cylinder 37. These also move outward guided by the pins 24 until the shoulders 29 are contacted. In this position, shown in FIG. 4, the limits of the annular flanges 14 and 16 are passed and the upper vessel part 7 is free for removal. With such an arrangement, a highly effective and quick acting sealing device is provided. Furthermore, since all of the parts of the clamping device are connected to the lower part 8 of the sphere the upper part 7 is free of any encumbrance.

A significant advantage of the clamping device of the subject invention is the seal 18 which is provided along the joint 17 which is disposed in the direction of separation of the vessel parts. As previously mentioned in the modification of the invention shown, this joint is in a vertical plane. When the vessel 6 is in the condition shown in FIG. 1 and fluid is inserted under extremely high pressures, there will be some relative movement between the upper and lower vessel parts regardless of the amount of holding force that can be exerted by the clamping device. Since the seal 18 is provided along a vertical joint 17, limited relative movement between the upper and lower vessel parts can be accepted without destroying the seal. If the seal were along a horizontal joint and relative vertical movement resulted between the upper and lower vessel parts, the high pressure within the vessel could quite likely blow the seal out of the seat and thereby destroy the vessel seal.

Although only one embodiment of the subject invention has been herein shown and described, other modifications will be obvious to those skilled in the art after this description is read and it is intended that all such modifications as come within a reasonable interpretation of the appended claims be covered.

The embodiments of the invention in which an exclusive property or privilege is claimed are defined as follows:

1. In combination with a two part high pressure vessel with each part having a complementary surface for uniting both parts to form a fluid tight vessel, means for connecting and disconnecting said parts comprising: a first inner clamp for engaging the inner surfaces of said parts; a second outer clamp for engaging the outer surfaces of said parts; a first member connected to said inner clamp for movement therewith; a second member connected to said outer clamp for movement therewith, said first and second members being connected together for relative movement; means for causing relative movement between said members; first guide means connected to said vessel and engaging with said outer clamp to permit limited guided movement thereof; and second guide means connected to said vessel and engaging with said inner clamp to permit limited guided movement thereof, the extent of limited guided movement of said clamp permitted by either guide means being less than the extent of relative movement between said members.

2. The combination set forth in claim 1 wherein both said members and said guide means are connected to only one of said vessel parts.

3. The combination set forth in claim 1 wherein said first and second members comprise a fluid operated piston and cylinder.

References Cited by the Examiner
UNITED STATES PATENTS

| | | | |
|---|---|---|---|
| 429,660 | 6/1890 | Sullivan | 220—80 |
| 2,947,440 | 8/1960 | Slota | 220—80 X |
| 3,101,208 | 8/1963 | Clifford | 220—80 X |

THERON E. CONDON, *Primary Examiner.*

GEORGE E. LOWRANCE, *Examiner.*